May 25, 1943.　　　V. F. BOHMAN　　　2,320,258
SWITCHING MECHANISM
Filed Nov. 26, 1941　　　4 Sheets-Sheet 1
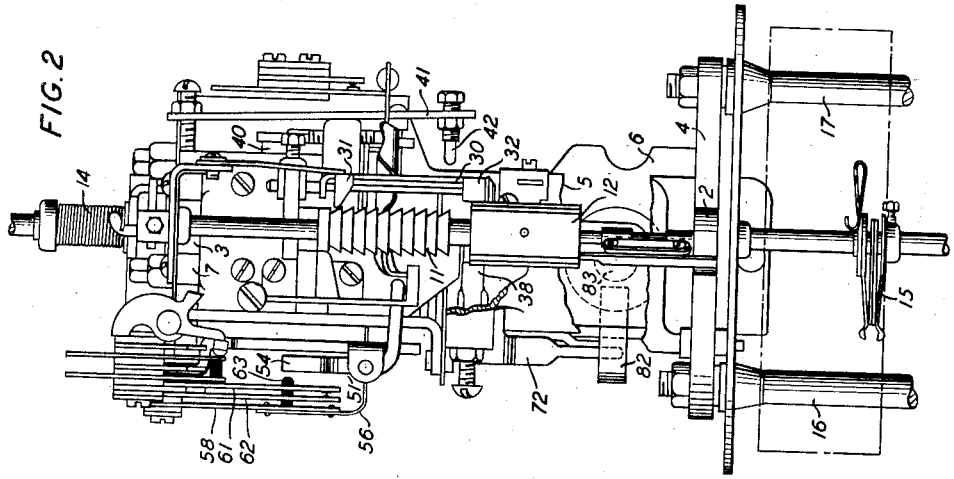
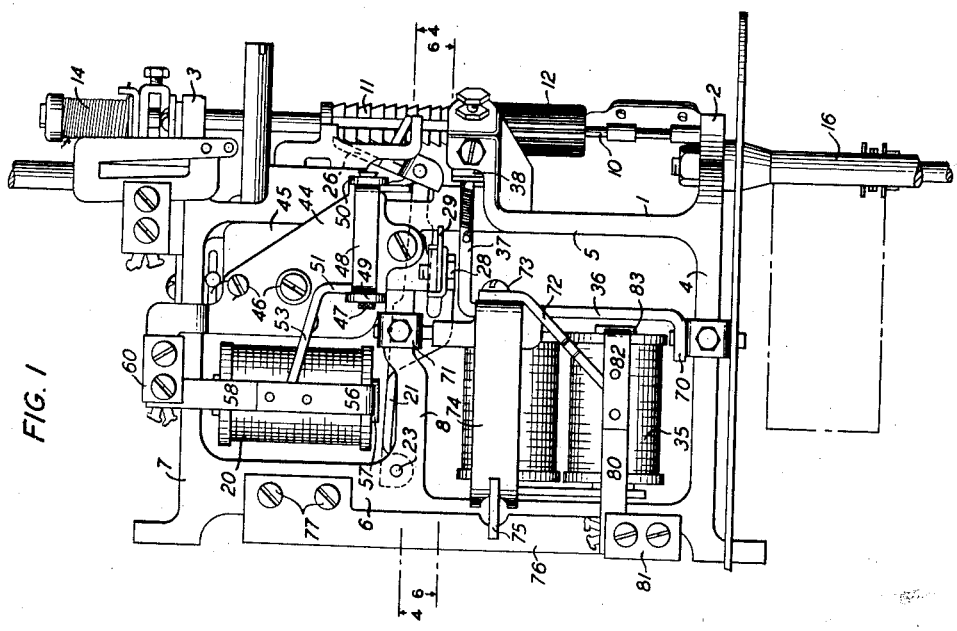
INVENTOR
V. F. BOHMAN
BY
ATTORNEY May 25, 1943.  V. F. BOHMAN  2,320,258
SWITCHING MECHANISM
Filed Nov. 26, 1941  4 Sheets-Sheet 2
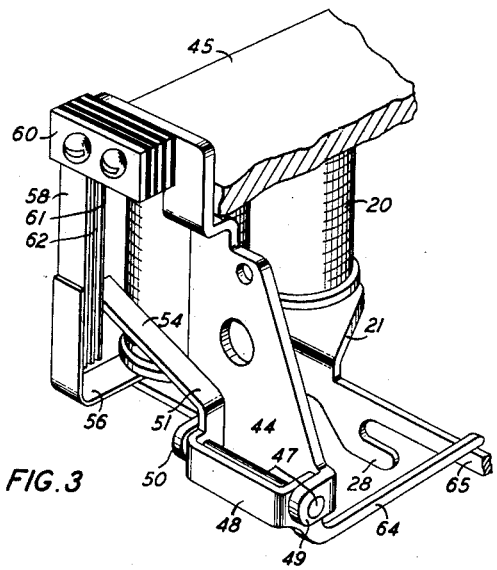
FIG. 3
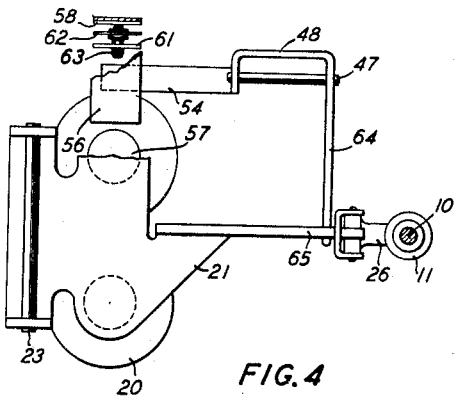
FIG. 4
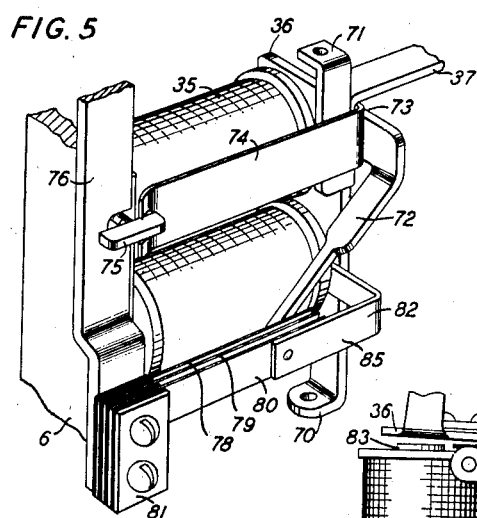
FIG. 5
FIG. 7
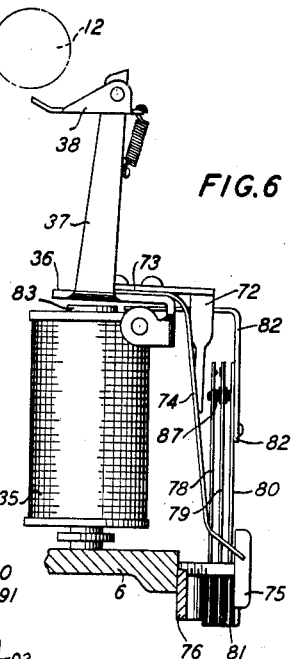
FIG. 6
INVENTOR
V. F. BOHMAN
BY M. T. McKenney
ATTORNEY

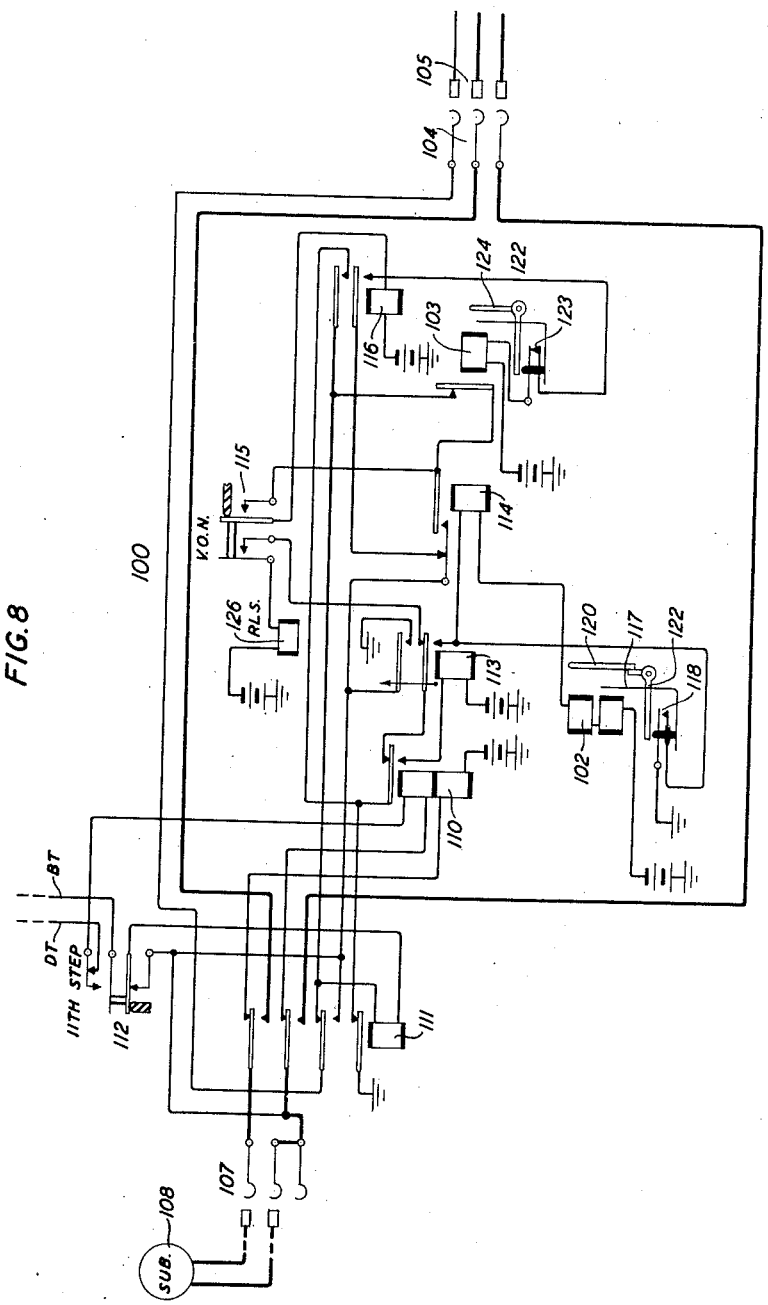

May 25, 1943.  V. F. BOHMAN  2,320,258
SWITCHING MECHANISM
Filed Nov. 26, 1941  4 Sheets-Sheet 4

INVENTOR
V. F. BOHMAN
BY
ATTORNEY

Patented May 25, 1943

2,320,258

UNITED STATES PATENT OFFICE 2,320,258

SWITCHING MECHANISM

Vincent F. Bohman, Astoria, N. Y., assignor to Bell Telephone Laboratories, Incorporated, New N. Y., a corporation of New York Application November 26, 1941, Serial No. 420,449

8 Claims. (Cl. 179—27.52)

This invention relates to switching mechanisms and particularly to switching mechanisms when employed in telephone systems.

An object is to improve the operating characteristics of such mechanisms and to insure more reliable performance under varying conditions in regard to operating current impulses.

Heretofore switching mechanisms have been provided with so-called pulse-aid arrangements for maintaining stepping magnets operated until the completion of the operative strokes of the magnet and in response to energizing impulses regardless of variations in the duration of such impulses. Such arrangements, however, have involved means not directly controlled by the stepping magnets as for example the arrangement disclosed in the Patent No. 2,006,354 of July 2, 1935 to H. Hovland in which the so-called double dog holding pawl controls a locking circuit for a stepping magnet which is maintained until this dog drops into the next tooth of ratchet wheel stepped by the armature of said magnet. Arrangements of this sort have been disclosed in connection with the well known Strowger type step-by-step switches.

It is a feature of the present invention to provide in this type of switching mechanisms in addition to the usual main armature actuated by a stepping magnet an auxiliary reed armature actuated when the stepping magnet is first energized by a pulsing circuit, to close a set of contacts for a locking circuit to maintain the stepping magnet energized until the main armature is fully attracted, when the main armature causes the locking circuit through said contacts to open. This insures a full operation of the stepping magnet regardless of the duration of the energizing impulse.

This invention has been illustrated in the accompanying drawings in which Fig. 1 shows a side view of a switch of the Strowger type to which the applicant's invention has been applied;

Fig. 2 shows a front view of the switch shown in Fig. 1;

Fig. 3 is a partial perspective view of the applicant's invention as applied to the vertical stepping magnet in the switch shown in Figs. 1 and 2;

Fig. 4 is a cross section taken approximately on the line 4—4 of Fig. 1 showing the applicant's invention applied to the vertical stepping magnet;

Fig. 5 is a partial perspective view of the applicant's invention applied to the rotary stepping magnet in the switch shown in Figs. 1 and 2; and Fig. 6 is a cross section taken approximately on the line 6—6 of Fig. 1 showing the applicant's invention applied to the rotary magnet;

Fig. 7 shows a modified arrangement of the locking circuit closing contacts and auxiliary armature in accordance with the applicant's invention;

Figs. 8 and 9 show circuits of a telephone system employing switches to which the applicant's invention has been applied.

Figure 9:
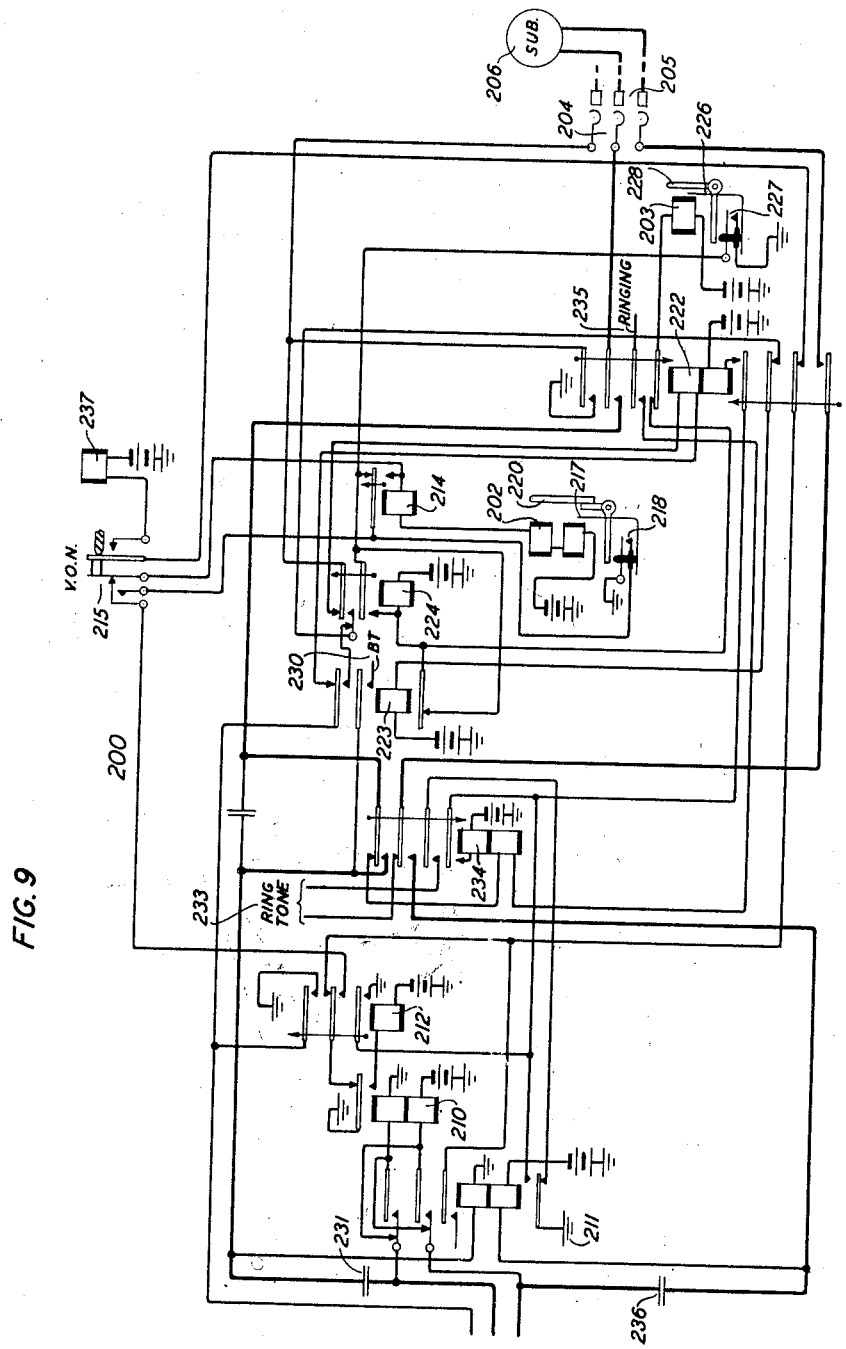

Referring now to the drawings and particularly to Figs. 1 to 6, in general the mechanism provided in this type of switch consists of the following parts. A molded frame structure 1 which is provided with forwardly projecting members 2 and 3, a base member 4, a front member 5, a rear member 6, a top member 7 and an intermediate cross member 8 on which the various stationary and movable parts of the mechanism are mounted. Through apertures in members 2 and 3 are journaled an operating shaft 10 having a vertical ratchet 11 and a rotary ratchet 12 by means of which the shaft 10 is lifted and rotated by armatures and pawls as controlled by vertical and horizontal magnets as will be described hereinafter. At the upper end of the shaft 10 is mounted a spring 14 to return the shaft from a rotary position to normal and at the opposite lower end are mounted sets of brushes, one set of which has been shown at 15, and which may be lifted and rotated to establish connections with terminal banks (not shown) but generally mounted on posts 16 and 17 which are secured to the bottom member 4. To lift the shaft vertically a vertical magnet 20 is mounted on the member 7 which magnet operates an armature 21 mounted at 23 between the cross member 8 and a lug (not shown) but extending from the rear member 6. This armature is provided with a pawl 26 which engages the ratchet 11 each time the armature is operated. The armature 21 is provided with an extension 28 which operates on a locking spring 29 for the usual "double dog" holding pawl 30 having an upper pawl member 31 engaging ratchet 11 when the holding pawl is released to hold the shaft in a raised position and a lower member 32 which engages the ratchet 12 when the holding pawl is released, to hold the shaft in an advanced rotary position. On the rear member 6 is mounted a rotary magnet 35 which operates an armature 36 having a forwardly extending bracket 37 on which the pawl 38 is mounted to engage the ratchet 12 and rotate it when the magnet 35 is operated. To release the shaft to normal position after having been operated by the vertical and rotary magnets 20 and 35, the release magnet 40 is provided, mounted on the frame member 8 and which operates the armature 41 having a pin 42 that acts on an extension of the holding pawl 30 to cause the pawls 31 and 32 to release the shaft. The shaft is rotated back to normal under tension of the spring 14 and returns from its vertical position by means of gravity. This switching mechanism may be controlled by first operating the vertical magnet 20 to raise the shaft to a desired level and then operating the rotary magnet 35 to rotate the shaft 10 on this level to cause the brushes 15 and other brushes (not shown) to engage desired terminals in associated banks.

Referring now to the pulse-help arrangement in accordance with the applicant's invention as applied to the vertical operating magnet 20, reference may be had particularly to Figs. 1, 3 and 4. This mechanism consists of a bracket 44 secured to an extension 45 on the frame by means of screws 46. On this bracket 44 is mounted by means of a pin 47 a lever 48 between the ears 49 and 50. This lever is provided with an angularly projecting member the purpose of which will be described hereinafter. A reed armature 56 is bent at right angles to come in close proximity to the core 57 of the magnet 20. The reed 56 is at the opposite end attached to leaf spring 58 which is secured at 60 with the contact springs 61 and 62. The member 51 projects in position to engage the insulation stud 63 which projects through an opening in the spring 61 and is connected to spring 62. This stud 63 at its opposite end contacts with the spring 58. The lever 48 is provided also with a projecting arm 64 engaging an extension 65 on the armature 21. The operation of this mechanism is as follows: When the magnet 20 is first energized reed armature 56 is attracted towards the core 57 by stray flux from the core as it is not located in any closed magnetic circuit through the magnet 20 as is the main armature 21. This armature 56 thereby operates on stud 63 to force spring 62 in connection with spring 61 to close a locking circuit for the magnet 20 as will be described hereinafter in connection with Figs. 8 and 9. When the armature 21 is fully operated by this energization of magnet 20, the member 51 will engage the stud 63 and thereby move contact spring 62 away from spring 61 and through spring 58 move the reed armature 56 away from core 57. The abovementioned locking circuit for magnet 20 is thereby opened through springs 61 and 62 at the end of the forward stroke of the armature 21.

Referring now to the pulse-help arrangement provided in accordance with the applicant's invention as applied to the rotary magnet 35, reference may be made particularly to Figs. 1, 5 and 6. The armature 36 for this rotary magnet 35 is mounted in bearings at points 70 and 71 and is provided with an extension member 72 secured at the point 73 to the armature 36. Between the armature and this extension member is also secured at the point 73 a return leaf spring 74 which is engaged by the wing of an adjusting screw 75 secured to the rear frame member 6. This screw 75 may be adjusted to tension the leaf spring 74 to hold the armature in the normal position. On the bracket 76 secured to the frame member 6 at 77 are mounted two contact springs 78 and 79 and an outside leaf spring 80 at the point 81. On leaf spring 80 is mounted a magnetic reed 82 bent at right angles to the spring 80 to come at its free end in close proximity to the core 83 of the magnet 35. The member 72 is located to normally be out of contact with but in close proximity to the stud 87 secured to contact spring 79. Stud 87 projects through an opening in spring 78 at one end and at the other end contacts with the leaf spring 80. The connection between the contact spring 78 and 79 is normally held open by the tension of spring 78. When the rotary magnet 35 is first energized by an impulse circuit as will be described in connection with Figs. 7 and 8, the reed spring 82 is immediately attracted by the core 83 by stray flux from the core to move the leaf spring 80 and stud 87 so that spring 79 establishes a connection with spring 78 while later, when the magnet is fully energized and the main armature 36 is attracted by the core the member 72 engages stud 87 to separate spring 79 from spring 78 and thus open the connection between these springs. In this manner a locking circuit provided through contacts 78 and 79 is closed by the reed armature and maintained closed until the armature 36 is fully attracted when this locking circuit is opened at contacts 78 and 79 by the main armature as will hereinafter be described in connection with Figs. 8 and 9.

The modification shown in Fig. 7 of the locking circuit contacts may be applied in place of the arrangement for the rotary magnet 35, but it is understood that it may be equally well applied in place of the arrangement for the vertical magnet 20. This locking circuit arrangement may consist of an extension member 89 secured to the armature 36 in the same manner as member 72. The reed armature 90 is mounted with springs 91 and 92 at 81 directly on bracket 76. When the reed armature is first attracted by core 83, it will release stud 93, which is connected to spring 92 and passes freely through an opening in spring 91, and thereby permits spring 92 due to its tension towards the left, looking at this figure, to make connection with spring 91 to close the locking circuit. When the armature 36 is fully attracted by core 83, the insulation stud 94 on member 89 will engage the reed armature 90 and force through stud 93 the spring 92 away from spring 91 to open the locking circuit.

In Figs. 8 and 9 are shown a typical automatic telephone system in which switches of the type disclosed in the preceding figures are employed. Fig. 8 shows a selector circuit 100 in which the vertical magnet of the selector switch is shown at 102 and the rotary magnet at 103 and the brushes at 104 for connection to terminals such as 105 leading to a connector circuit 200 in Fig. 9 in which the vertical magnet of the connector switch is shown at 202 and the rotary magnet at 203 and the brushes at 204 having access to terminals such as 205 leading to a called subscriber's line and subset at 206. These selector and connector switches may be arranged with pulse-help equipments in accordance with the applicant's invention constructed as disclosed in the preceding figures although in the arrangement for the rotary magnet in the selector 100 while constructed in a similar manner is employed merely as a self-interrupting arrangement with the connections for the self-interrupting circuit normally closed. The selector 100 is connected through a usual line finder 107 having access to a calling subscriber's line and set as shown at 108.

The operation of these circuits is as follows:

If the subscriber at 108 calls, a connection is established in the usual manner through the line finder 107 to connect the subscriber's line to an idle selector such as 100. When this connection is made, a circuit is established for the operation of pulsing relay 110 from battery through the lower winding of this relay, contacts of relay 111, through the line-finder 107 and subscriber's station 108 back through contacts of relay 111, upper winding of relay 110, eleventh step contacts 112 to ground through a dial tone circuit (not shown). The operation of relay 110 closes a circuit for the slow-to-release relay 113, from battery through the winding of this relay, contacts of relays 110 and 111 to ground. When now the calling subscriber dials the first digit relay 110 will respond by releasing for each impulse while the slow-to-release relay 113 remains energized during the pulsing. The first release of the pulsing relay 110 closes a circuit for the operation of the vertical magnet 102 and relay 114 from battery through the windings of this magnet and relay in series, contact of relays 113, 110 and 111 to ground. When the pulsing relay 111 is again energized after the first release a circuit is completed through the vertical off-normal contacts 115 as the magnet 102 is taking its first step for the operation of relay 116 as follows: Battery, winding of this relay, vertical off-normal contacts 115, contacts of relays 114 and 113 to ground. When relay 116 operates it is locked over a circuit from battery through the winding of this relay, vertical off-normal contacts 115, contacts of the rotary magnet 103, contacts of relay 116, to ground at contacts of relay 111 independent of the energizing circuit closed by the operation of relay 114. When the vertical magnet first operates, it attracts the auxiliary armature 117 to close the connection between contacts 118 so as to establish a locking circuit for the vertical magnet 102 from battery through the winding of this magnet, winding of relay 114, contacts 118 to ground until the main armature 120 operates fully when the lever mechanism 122 in accordance with the applicant's invention as disclosed in the preceding figures, causes the opening of the connection between the contacts at 118 and thus opens the locking circuit for magnet 102, that is to say, this locking circuit is closed and maintained until the vertical magnet is completely operated by its main armature 120 and thus insures that the vertical magnet will take a complete step regardless of whether or not the energizing impulse, due to dialing has maintained the pulsing relay 110 released for a sufficient period to cause this magnet to take a full step.

At the end of the dialing of this digit, the relay 114 will release with the release of the vertical stepping magnet 102 and the rotary magnet 103 will be energized to start hunting for an idle connector. The circuit for the rotary magnet now may be traced from battery through the winding of the rotary magnet 103, self-interrupting contacts 123, contacts of relays 116, 114 to ground at relay 113. The self-interrupting circuit to insure the rotary magnet 103 to take a full step to rotate the brushes to engage the terminals of a first connector is established as soon as the rotary magnet begins to energize by the magnet attracting its reed armature 122 to maintain closed the connection through contacts 123. When the main armature 124 is fully operated, the connection between the contacts 123 is opened to permit the rotary magnet 103 to release. On the operation of the rotary magnet 103 the locking circuit for relay 116 is opened at the contacts of this magnet causing relay 116 to release. In case the brushes 104 encounter terminals associated with a busy connector, ground will be supplied for the sleeve brush from this connector and thus cause relay 116 to again operate over a circuit from battery, winding of relay 116, vertical off-normal contacts 115, contacts of the rotary magnet 103 when it releases, contacts of relay 111, sleeve of brushes 104 to ground at the busy connector. This permits the circuit for the rotary magnet 103 to be again closed from battery, through the winding of this magnet, contacts 123, contacts of relays 116 and 114 to ground at contacts of relay 113. If the brushes then land on terminal of another busy connector relay 116 will again be operated to close the circuit for the rotary magnet 103 to take a succeeding step. These operations continue until an idle connector is found when ground is present on the sleeve terminal and consequently relay 116 will have no circuit for operating it at this time and the rotary magnet will therefore not be again operated. On the other hand it should now be noted that the relay 111 will at this time operate from battery through the winding of relay 116, vertical off-normal contacts 115, contacts of rotary magnet 103, winding of relay 111, eleventh step contacts 112, contacts of relay 113 to ground. Relay 116 will not operate in this circuit but relay 111 in operating disconnects the pulsing relay 110 from the calling line and connects the calling line tip and ring conductors to the tip and ring brushes of the selector over the associated terminals of the idle connector to which these brushes have been connected. Relay 113 releases on the release of relay 110 and the circuits in the selector now remain as established until the connection is dismissed. However, a locking circuit for maintaining relay 111 is now established over a second upper armature and front contact of relay 111 to ground on the sleeve which will be supplied at the connector 200 before relay 113 releases, that is, the connection through the calling subscriber's loop being now extended to the tip and ring conductors through the connector will energize relay 210, from battery and ground through the windings of this relay and contacts of relay 211 and the tip and ring conductor loop. Relay 210 in operating closes an obvious circuit for the operation of relay 212 and this relay closes a connection to ground for the sleeve to maintain relay 111 operated.

When now the calling subscriber dials the next digit, the pulsing relay 210 will release and operate in accordance with pulsing. On the first release of relay 210, a circuit is established for the vertical magnet 202 and relay 214 from battery through the winding of this magnet and relay, vertical off-normal contacts 215, contacts of relays 212 and 210 to ground. As the vertical magnet 202 operates, the vertical off-normal contacts will shift and close a circuit through the vertical off-normal contacts, contacts of relay 214 for the next impulse for the magnet 202. Relay 214 being slow in releasing will remain operated during the succeeding impulses. Magnet 202 when it begins to energize will immediately attract its reed armature 217 to close the connection through contacts 218 for a locking circuit from battery through the winding of the vertical magnet 202, the winding of relay 214 and its contacts to ground through contacts 218. When the main armature 220 is fully attracted, the mechanism in accordance with the applicant's invention as disclosed in the preceding Figures 1 to 6, will cause the opening of the connection of the contacts 218 and thus open this locking circuit insuring that the vertical magnet takes a complete step for each of its operations. The succeeding operations of the vertical magnet will take place over the circuit from battery through the winding of this magnet, winding of relay 214, contacts of vertical off-normal contacts 215, contacts of relays 212 and 210 to ground. At the end of the dialing of this digit, relay 214 will release and the subscriber may then dial the last digit. On the first release of relay 210 a circuit is closed for the operation of the rotary magnet 203 from battery through the winding of this magnet, contacts of relays 222, 223 and 214 vertical off-normal contacts 215, contacts of relays 212 and 210 to ground. Relay 224 also operates in this circuit from battery through the winding of this magnet, over the circuit just traced. Relay 224 will remain operated during the succeeding pulses. At the beginning of the operation of the rotary magnet 203, the reed armature 226 will be attracted to close contacts 227 for a locking circuit from battery through the winding of magnet 203, contacts of relays 222 and 224, contacts 227 to ground. Then when the main armature 228 is fully attracted, the connection through contacts 227 will be opened by the mechanism as shown in the Figs. 5 and 6 and the locking circuit will be opened at the end of the stroke, thus insuring full operation of the rotary magnet 203 for each impulse. The succeeding impulses will operate the rotary magnet 203 to step the brushes 204 to the called subscriber's line and subset at 206 and when this last series of impulses ceases, relay 224 will release if the subscriber is idle. If, however, the subscriber is busy, a busy signal will be established before relay 224 releases over the line through to the calling subscriber by the operation of the busy signal relay 223 over a circuit from battery through the winding of this relay, contacts of relays 222 and 224 to the busy ground on the sleeve of the brush 204. Relay 223 in operating closes a locking circuit for itself when relay 224 releases over the make-before-break contacts of this relay and contacts of relay 223 to ground at contact of relay 212. The busy signal source at 230 will then be connected over contacts of relay 223 over the tip conductor through condenser 231 to the calling subscriber. If on the other hand the calling subscriber is idle, relay 224 releases as mentioned and causes the operation of relay 222 from battery on the sleeve conductor from the called subscriber, contacts of relay 224, upper winding of relay 222, contacts of relays 223 and 212 to ground. Relay 222 provides a locking circuit for itself from battery through its lower winding and lower inner armature and front contact of relay 212 to ground. The operation of ringing relay 222 closes the connection from the ringing source 230 over contacts of relay 234, 222 through the called subscriber's loop over brushes 204, contacts of relays 222 and 234 and lower winding of relay 234, contacts of relay 222, to the ringing interrupter ground at 235. When the called subscriber answers, the ringing interrupter ground at 235 connected over the subscriber's loop through the lower winding of relay 234 operates this relay which provides a locking circuit for itself from battery through its upper winding and upper inner armature and front contact, to ground at relay 212. Relay 234 also connects the tip and ring conductors through its armatures and front contacts to the called subscriber's line at 206 and conversation may now take place between the calling and called subscribers 108 and 206. Talking battery for the called subscriber is supplied from battery and ground through the windings of relays 211 and talking battery for the calling subscriber is supplied from battery and ground through the winding of relays 210 and contacts of relay 211. A talking connection is established through condensers 231 and 236. The answering by the called subscriber now also causes the operation of relay 211 and reverses the battery to the calling subscriber over its armatures and front contacts from the relay 210. Relay 211 closes a substitute locking circuit for relays 234 and 222.

If the called subscriber at 206 hangs up his receiver at the end of the conversation, relay 211 releases which removes the substitute locking ground for ringing relay 234 and relay 222. When the calling subscriber hangs up, the relays 210 and 212 release which releases relays 234 and 222. The release magnet 237 for the connector is now operated over a circuit from battery, winding of magnet 237, vertical off-normal contacts 215, contacts of relays 222, 212 and 210 to ground to restore the connector switch to normal. The release of relay 212 also opens the sleeve ground to cause the release of relay 111. The release of relay 111 closes a circuit for the release magnet 126 in the selector from battery through the winding of this magnet, vertical off-normal contacts 116, contacts of relays 113, 110 to ground at relay 111. The operation of the release magnet 126 causes the selector switch to return to normal position.

What is claimed is:

1. In a stepping mechanism, a motor magnet, an energizing circuit therefor, a main armature, an auxiliary armature, interrupting contacts, a circuit including said contacts for locking said magnet, means for closing said contacts to lock said magnet operative by said auxiliary armature when said magnet is first energized by said first circuit, and means including said auxiliary armature for opening said locking circuit operative by said main armature when fully attracted.

2. In a stepping mechanism, a motor magnet, an energizing circuit therefor, a main armature, an auxiliary armature, interrupter contacts, a circuit including said contacts for locking said magnet, means for closing said contacts to lock said magnet operative by said auxiliary armature when said magnet is energized by said first circuit, a member operative by said main armature when fully attracted to act on the means for closing said interrupter contacts to overcome the magnetic effect of the auxiliary armature to open said contacts for locking the magnet.

3. In a stepping mechanism, a motor magnet, an energizing circuit therefor, a main armature, an auxiliary armature, interrupter contacts, a circuit including said contacts for locking said magnet, a pin controlled by the auxiliary armature when attracted by the energization of the magnet for closing said contacts to lock said magnet, a mechanism controlled by the main armature when fully attracted by the energization of the magnet for operating on said pin to open the contacts and restore the auxiliary armature to normal.

4. In a stepping mechanism, a motor magnet, an energizing circuit therefor, a main armature, a magnetic reed, interrupter contacts, a circuit including said contacts for locking said magnet, an extension on one of said interrupter contacts operated to close said contacts to lock said magnet under control of said reed when attracted by the magnet, and a lever mechanism controlled by said main armature when attracted by the magnet to actuate said extension to open the contacts near the end of the operative stroke of the main armature.

5. In a stepping mechanism, a motor magnet, an energizing circuit therefor, a main armature, a magnetic reed, interrupter contacts normally open, a circuit including said contacts for locking said magnet, an extension on one of said interrupter contacts operative to close said contacts to lock said magnet under control of said reed when moved from normal by the attraction thereof when the magnet is energized, a lever mechanism controlled by said main armature when fully attracted by the magnet to actuate said extension to open the contacts and restore the magnetic reed to normal.

6. In a stepping mechanism, a motor magnet, a circuit for momentarily energizing said magnet, a main armature, an auxiliary armature, interrupter contacts, a circuit including said contacts for energizing said magnet, means for closing said contacts to continue the energization of said magnet operative by said auxiliary armature when said magnet is momentarily energized by said first circuit, and means for opening said second circuit by opening the interrupter contacts and releasing the auxiliary armature operative by said main armature when fully attracted to deenergize the magnet and release the main armature.

7. In a stepping mechanism, a magnet, an energizing circuit therefor, a main armature and an auxiliary armature, contact springs normally opened, a second energizing circuit for said magnet including said contact springs, means controlled by said auxiliary armature when attracted by the magnet on the energization thereof by said first circuit for closing said second circuit through said contact springs to continue the energization of said magnet, and means controlled by said main armature when fully attracted by said magnet for releasing said auxiliary armature and said means controlled thereby to open said second circuit, through said contact springs to permit the deenergization of said magnet.

8. In a stepping mechanism, a magnet, an energizing circuit therefor, a main armature and an auxiliary armature, contact springs normally opened, a second energizing circuit for said magnet including said contact springs, a pin on one of said contact springs engaged by said auxiliary armature when attracted by said magnet on the energization thereof by said first circuit for moving said contact spring toward the other spring to make a contact therewith to close said second circuit to continue the energization of said magnet and an extension on said main armature engaging said pin when said main armature is fully attracted by said magnet to move said first spring away from said second spring and to force said auxiliary armature away from said magnet to open said second circuit permitting the deenergization of said magnet.

VINCENT F. BOHMAN.